(12) United States Patent
Kiederle et al.

(10) Patent No.: US 12,310,453 B2
(45) Date of Patent: May 27, 2025

(54) LAYERED PRODUCT WITH FUNCTIONAL MEMBRANE, FOOTWEAR COMPRISING SUCH LAYERED PRODUCT, AND MANUFACTURING METHOD

(71) Applicant: W.L. Gore & Associates GmbH, Putzbrunn (DE)

(72) Inventors: Günter Kiederle, Oberpframmern (DE); Stane Nabernik, Kranj (SI); Maximilan Muth, Unterhaching (DE)

(73) Assignee: W. L. Gore & Associates GmbH, Putzbrunn (DE)

( * ) Notice: Subject to any disclaimer, the term of this patent is extended or adjusted under 35 U.S.C. 154(b) by 783 days.

(21) Appl. No.: 16/487,655

(22) PCT Filed: Feb. 23, 2017

(86) PCT No.: PCT/EP2017/000256
§ 371 (c)(1),
(2) Date: Aug. 21, 2019

(87) PCT Pub. No.: WO2018/153423
PCT Pub. Date: Aug. 30, 2018

(65) Prior Publication Data
US 2019/0365045 A1 Dec. 5, 2019

(51) Int. Cl.
*A43B 23/02* (2006.01)
*A43B 7/12* (2006.01)
(Continued)

(52) U.S. Cl.
CPC .............. *A43B 23/022* (2013.01); *A43B 7/12* (2013.01); *A43B 23/0235* (2013.01); *B32B 5/02* (2013.01);
(Continued)

(58) Field of Classification Search
None
See application file for complete search history.

(56) References Cited

U.S. PATENT DOCUMENTS 5,116,650 A * 5/1992 Bowser .................. B01D 71/44
428/36.1
6,497,934 B1 12/2002 Mahn, Jr. et al.
(Continued)

FOREIGN PATENT DOCUMENTS

CN 104812555 B 9/2016
CN 104814564 B 1/2018
(Continued)

OTHER PUBLICATIONS

English machine translation for the description of JP-2003145697-A obtained from ESPACENET (Year: 2003).*
(Continued)

*Primary Examiner* — Eli D. Strah
*Assistant Examiner* — Thomas J Kessler
(74) *Attorney, Agent, or Firm* — GREENBERG TRAURIG, LLP

(57) ABSTRACT

A layered product (1) comprises a waterproof and water vapor permeable membrane (4) having a first side (41) and a second side (42), the membrane comprising a membrane material (40, 40a, 40b) which is waterproof and water vapor permeable, and thermoplastic material (3) which covers at least a portion of the first side (41) of the membrane (4) and is formed by at least one three-dimensional build layer (3-1 to 3-n) printed onto the first side (41) of the membrane such that the thermoplastic material (3) of the at least one three-dimensional build layer (3-1 to 3-n) is bonded to the membrane material (40, 40a, 40b) of the membrane. The layered product can be part of footwear, such as a bootie or upper material.

18 Claims, 10 Drawing Sheets

Figure 2A:
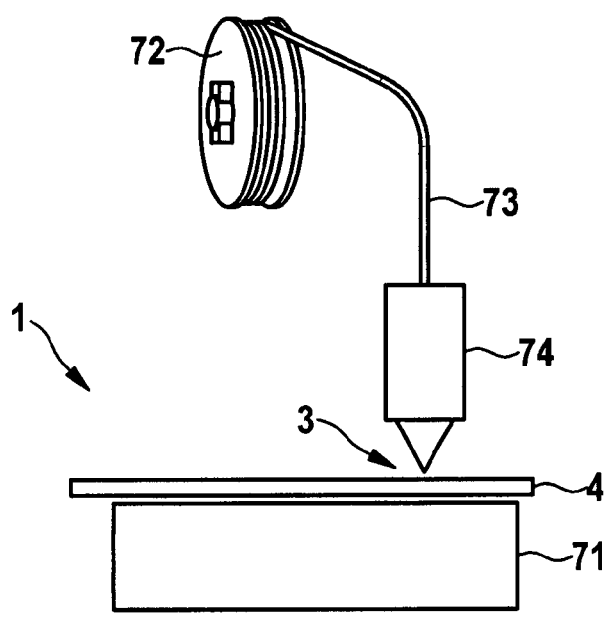

(51) Int. Cl.
  *B32B 5/02*     (2006.01)
  *B32B 27/12*    (2006.01)
  *B32B 27/34*    (2006.01)
  *B32B 27/36*    (2006.01)
  *B32B 27/40*    (2006.01)
  *B33Y 80/00*    (2015.01)
  *B29C 64/106*   (2017.01)
  *B29L 31/50*    (2006.01)
  *B33Y 10/00*    (2015.01)

(52) U.S. Cl.
  CPC .............. *B32B 27/12* (2013.01); *B32B 27/34* (2013.01); *B32B 27/36* (2013.01); *B32B 27/40* (2013.01); *B33Y 80/00* (2014.12); *B29C 64/106* (2017.08); *B29L 2031/505* (2013.01); *B32B 2262/0261* (2013.01); *B32B 2305/02* (2013.01); *B32B 2307/724* (2013.01); *B32B 2307/7265* (2013.01); *B32B 2437/02* (2013.01); *B33Y 10/00* (2014.12)

(56) References Cited

U.S. PATENT DOCUMENTS

| | | |
|---|---|---|
| 8,997,530 B1 | 4/2015 | Podhajny |
| 9,474,331 B2 | 10/2016 | Waatti |
| 2005/0210708 A1 | 9/2005 | Chen |
| 2010/0011619 A1* | 1/2010 | Bastianelli ............... A43B 9/02 36/87 |
| 2010/0071115 A1 | 3/2010 | Sadato |
| 2015/0183156 A1 | 7/2015 | Cross et al. |
| 2015/0230554 A1 | 8/2015 | Bacino et al. |
| 2015/0320138 A1 | 11/2015 | McSowell et al. |
| 2016/0166011 A1 | 6/2016 | Bruce et al. |
| 2016/0185041 A1 | 6/2016 | Lisagor et al. |
| 2016/0219982 A1 | 8/2016 | Waatti |
| 2017/0306539 A1* | 10/2017 | Gladish .................... D04H 1/76 |

FOREIGN PATENT DOCUMENTS

| | | | |
|---|---|---|---|
| EP | 0156848 | A1 | 10/1984 |
| FR | 2526668 | | 11/1983 |
| GB | 1356738 | | 6/1974 |
| JP | 2003145697 | A * | 5/2003 |
| KR | 10-2016-0115967 | | 10/2016 |
| WO | 2005037542 | A1 | 4/2005 |
| WO | WO-2005037543 | | 4/2005 |
| WO | WO-2014015037 | | 1/2014 |

OTHER PUBLICATIONS

International Search Report and Written Opinion from International Application No. PCT/EP2017/000256 dated Apr. 20, 2017.
Palm, "3D printing ETPU/TPU/TPE Tricks & Tips"; Jun. 16, 2016 <<http://rubber3Dprinting.com/wp-content/uploads/2015/08/Rubber3Dprinting_ETPU-TPU-TPE.pdf>> retrieved Apr. 5, 2017.

* cited by examiner

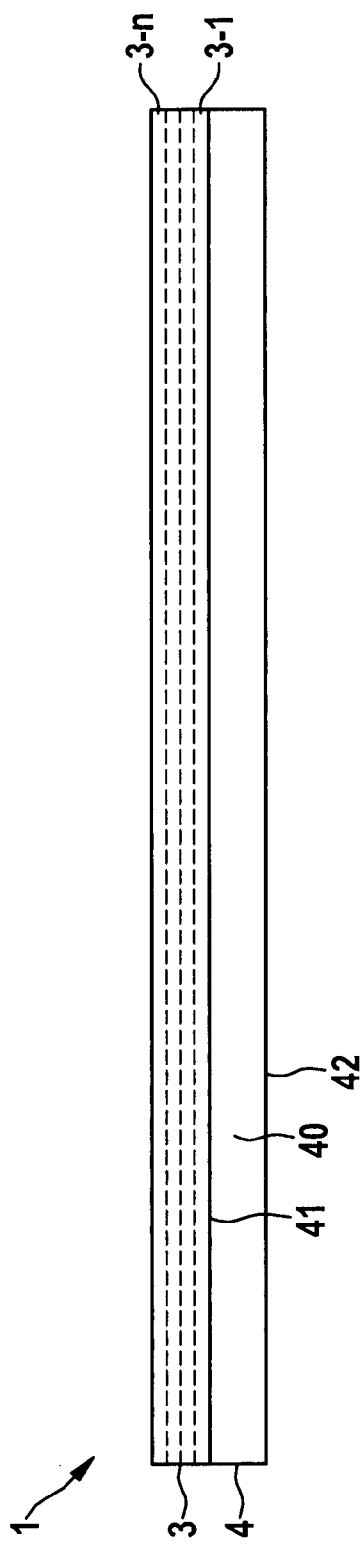
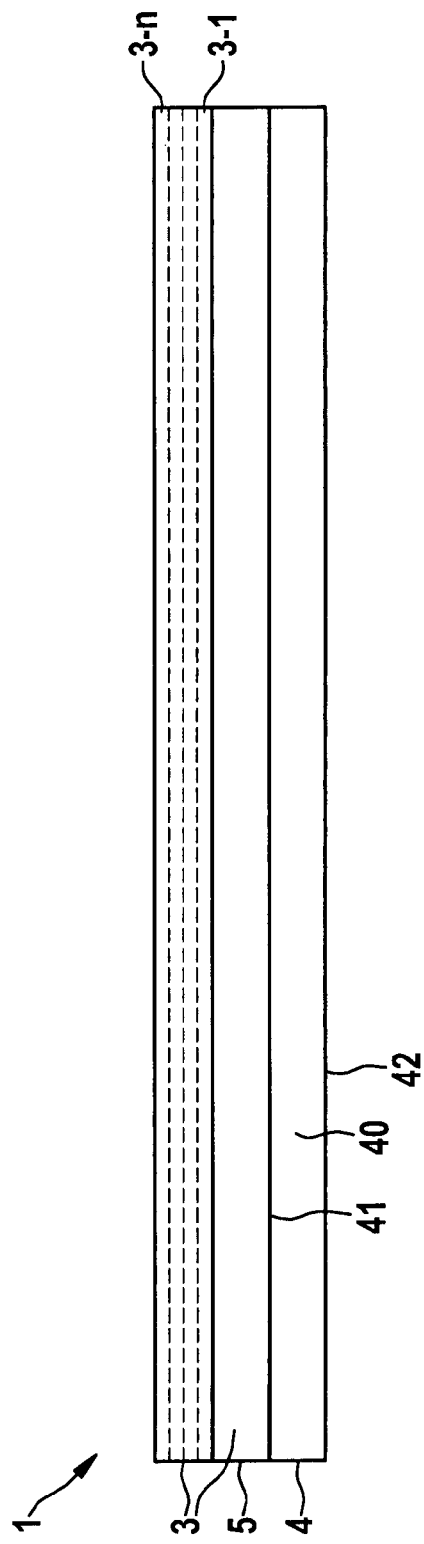

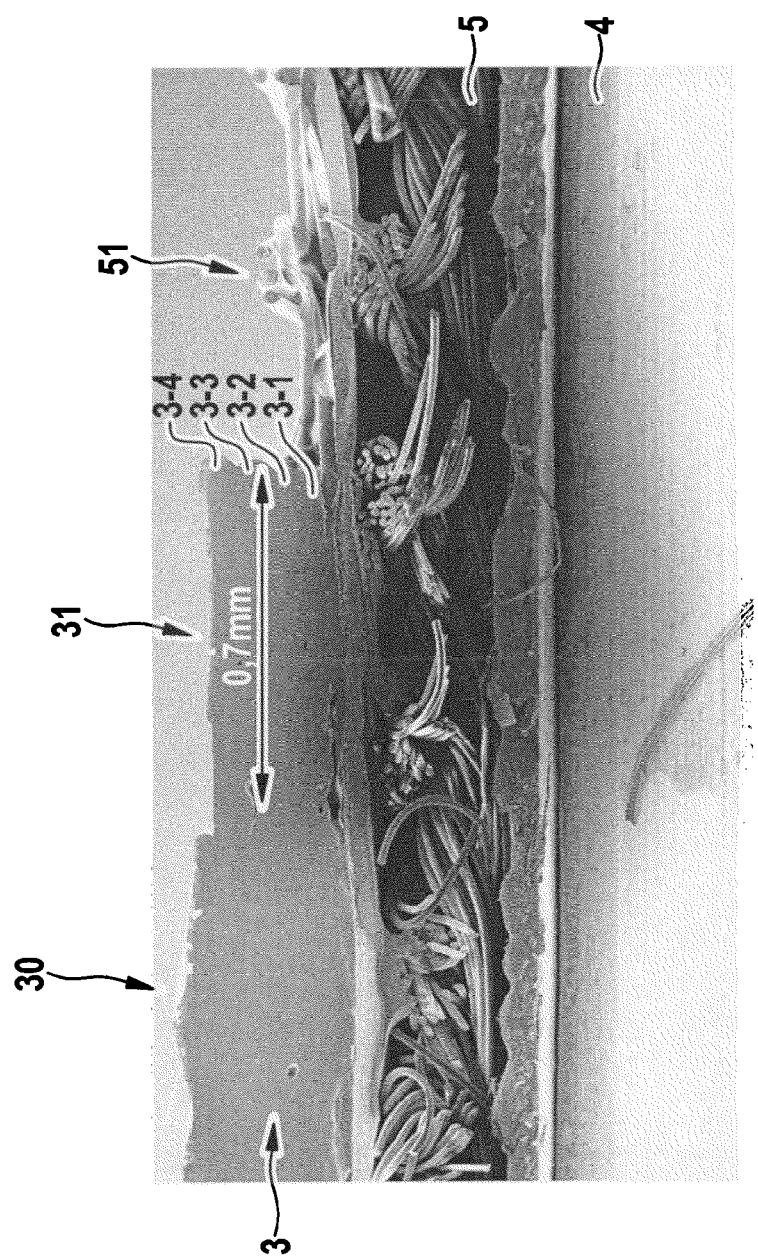

LAYERED PRODUCT WITH FUNCTIONAL MEMBRANE, FOOTWEAR COMPRISING SUCH LAYERED PRODUCT, AND MANUFACTURING METHOD

RELATED APPLICATIONS

The present application is a national phase filing under 35 USC 371 of International Application No. PCT/EP2017/000256, filed on Feb. 23, 2017, the entire content and disclosure of which is hereby incorporated by reference in its entirety.

The present invention relates to a layered product with a waterproof and water vapor permeable membrane and footwear comprising such layered product, and to a method of manufacturing such layered product.

Protective clothing articles are used for wear in outdoor conditions like wet conditions (such as rain, snow, wind, etc.) and should protect the wearer by preventing leakage of water or other fluids into the article while keeping the wearer comfortable, such as by allowing water vapor to permeate through the clothing article to the outside. In addition, such an article should maintain the functional attributes of protection and comfort during ordinary use.

Generally, garments and shoes in early times were either breathable but not waterproof, or waterproof but not breathable (such as rubber jackets or rubber boots). Then membranes or laminates were used to line clothing or uppers of shoes or the sole areas of shoes to make them waterproof and breathable. Furthermore, in some type of shoes, openings or holes were made in the soles and/or uppers of the shoes to increase the breathability.

Particularly, regarding articles of footwear, in earlier times, shoes had either a certain water vapor permeability in the sole area, also called breathability, as a result of the use of a shoe sole material such as leather, with the drawback of water permeability in the sole area, or shoes were waterproof and water vapour impermeable in the sole area as a result of the use of outsoles made of a waterproof material, such as rubber or a rubber-like plastic, with the drawback that moisture could accumulate in the foot sole area.

In more recent times, shoes that are waterproof and also water vapor permeable in the foot sole area have been created by perforating their soles with through-holes and covering the through-holes with a waterproof, water vapor-permeable membrane, so that no water can penetrate into the shoe interior from the outside, but moisture that forms in the foot sole area can escape outward from the shoe interior. Two different solutions have been pursued here. Either the sole has been provided with vertical through-holes through which water vapor can be guided from the shoe interior to the walking surface of the sole, or the sole has been provided with horizontal channels through which water vapor that has accumulated above the outsole can escape through the side periphery of the sole. Other variants provide an air permeable upper, or openings in parts of the upper, which allow for airflow in the horizontal direction of the shoe, such as through an air permeable spacer structure in the bottom part of the upper above the sole. In order to make such footwear waterproof, membranes are typically used which nevertheless make at least part of the shoe, such as the part above the sole, waterproof and water vapor permeable.

Where flexibility of movement is essential, elastic or stretchable fabric laminates and/or shoe uppers with the above functional attributes are desired along with a soft and drapable feeling.

Thus, there is a need for a composite that achieves a high degree of waterproofness, breathability, flexibility, and comfort in use within a variety of applications, including clothing articles and footwear.

Embodiments disclosed herein provide a layered product comprising a waterproof and water vapor permeable membrane having a first side and a second side, the membrane comprising a membrane material which is waterproof and water vapor permeable, the layered product further comprising a thermoplastic material which covers at least a portion of the first side of the membrane and is formed by at least one three-dimensional build layer printed onto the first side of the membrane such that the thermoplastic material of the at least one three-dimensional build layer is bonded to the membrane material of the membrane.

With such layered product, fabrics, laminates and shoe uppers with the above functional attributes can be manufactured which are flexible and thin enough to be integrated in light clothing articles or light footwear, such as sport shoes, to be worn in warm and/or demanding conditions. Yet the thermoplastic material of the at least one three-dimensional build layer provides a durable and stiff enough component for the membrane to form the outside of the clothing article or footwear, such as an upper of footwear.

As such, a composite article can be provided that achieves a high degree of waterproofness, breathability, flexibility, and comfort in use within a variety of applications, including clothing articles and footwear. Since the at least one three-dimensional build layer of the thermoplastic material is manufactured by use of a 3D printing apparatus, the manufacturing costs can be kept quite low. Furthermore, by use of a 3D printing apparatus, a durable component for the membrane can be created in any geometry tailored to the needs of the respective application, for example by selectively depositing a desired number of build layers of the thermoplastic material upon one another, e.g. in combination with a desired thickness and/or geometry of the respective build layer. In particular, the thermoplastic material is formed by at least two three-dimensional build layers.

According to an embodiment, the layered product further comprises at least one first textile between the first side of the membrane and the at least one three-dimensional build layer. According to a further embodiment the textile comprises filaments. These filaments may comprise monofilaments or multifilaments. The textile may be selected from knits, wovens or non-wovens. The thermoplastic material of the at least one three-dimensional build layer can bond to the textile and pass through the textile and bond effectively and durably to the membrane material.

According to an embodiment, at least part of the filaments is at least partly melted with the thermoplastic material. Thus, effective and durable bonding may be performed by at least partly melting the at least one first textile or part of its fibers (e.g., comprising monofilaments, such as polyamide (PA) monofilaments, e.g. Polyamide 6 or 66, e.g. used as a textile backer) and/or encasing the fibers (such as non-polyamide fibers).

According to an embodiment, the at least one first textile comprises monofilaments made from polyamide (PA).

According to an embodiment, the membrane material comprises at least one porous membrane material, wherein the thermoplastic material of the at least one three-dimensional build layer penetrates into pores of the at least one porous membrane material. Thus, effective and durable bonding may be achieved by penetration into pores of a porous membrane, e.g. made of expanded polytetraflouroethylene (ePTFE).

The pores of the porous membrane material can be measured with the Bubble Point method, according to the procedures of ASTM F316-86. Isopropyl alcohol is used as the wetting fluid to fill the pores of the test specimen. The reported value represents the average measurements for three samples. The Bubble Point is the pressure of air required to displace the isopropyl alcohol from the largest pores of the test specimen and create the first continuous stream of bubbles detectable by their rise through a layer of isopropyl alcohol covering the porous media. This measurement provides an estimation of maximum pore size.

According to an embodiment of the invention the membrane material has a bubble point of less than 400 kPa. This size allows for sufficient penetration of the thermoplastic material into the pores of the membrane to ensure good bonding.

According to an embodiment, the membrane material comprises at least one non-porous membrane material, wherein the thermoplastic material of the at least one three-dimensional build layer is melted with the at least one non-porous membrane material. Thus, effective and durable bonding may be achieved by melting the thermoplastic material with non-porous, monolithic membranes, e.g: made from polyurethane (PU) or a porous membrane with a monolithic layer on it.

The combination of the above described mechanisms, particularly in combination with use of at least one first textile between the first side of the membrane and the at least one three-dimensional build layer, makes the bonding quite strong, such that a durable and waterproof bond is created. With use of at least one first textile, mechanical stability of the final structure can be increased.

According to an embodiment, the at least one three-dimensional build layer is formed according to additive manufacturing technology, in particular according to fused deposition modeling (FDM) technology.

In an embodiment, the thermoplastic material comprises polyurethane (TPU), copolyester (TPC) or elastomers (TPE).

In another embodiment thermoplastic material can comprise at least one of: polylactic acid (PLA), acrylonitrile butadiene styrene (ABS), polyaryletherketone (PAEK), polytetraflouroethylene (PTFE), Nylon and Nylon based copolyester, alkenyl succinic anhydride (ASA), high impact polystyrene (HIPS), polyethylene (PE), polycarbonate (PC), polyamide (PA), polyethylene terephthalate (PET) and PET modified by glycol (PETG), DSM Arnitel Eco (Innoflex) polypropylene (PP), polyvinyl acetate (PVA), polyether ketone (PEK), polyetheretherketone (PEEK) and other thermoplastic elastomers and/or blends or co-polymers thereof. The material may also have fillers in it.

According to an embodiment, the at least one three-dimensional build layer is formed to be elastic. In particular, it is formed by at least one of elastic material and material providing elasticity by shape. Elasticity by shape means that the material is printed in a certain pattern, such as a zig-zag-like or meandering shape, which can be stretched out into e.g. a straight line. Advantageously, one can combine stiffness and elasticity requirements by creating particular patterns of the thermoplastic material, and/or by use of appropriately elastic printing materials.

According to an embodiment, the at least one three-dimensional build layer is formed in a zig-zag-like shape. In particular it is formed as a zig-zig. With such a shape, the at least one three-dimensional build layer can be formed to be elastic along its zig-zag extension.

In an embodiment, the membrane is provided with at least one seam. For example, the at least one seam is sewn. Advantageously, the at least one seam is covered by the at least one three-dimensional build layer which forms a waterproof seal on the seam. This can advantageously be made without use of a seam tape. Thus, an effective waterproofing of the membrane and seam can be performed, wherein the cumbersome use of a seam tape can advantageously be dispensed with.

Further, with employing 3D printing technology, waterproof seals can advantageously be created with membrane or membrane laminates of very different thicknesses and/or compressibility.

According to an embodiment, the membrane material comprises at least one of expanded polytetrafluorethylene (ePTFE), polyurethane (PU), polyester (PES) and copolyether ester, polyether, polyamide (PA), copolyether amides and polyacrylate, as well as other suitable thermoplastic and elastomeric films. In an aspect of the invention the waterproof, water vapor permeable membrane may be made of a fluoropolymer, particularly made of microporous expanded polyterafluorethylene (ePTFE). The microporous polytetrafluoroethylene membrane is a membrane of expanded polytetrafluoroethylene as taught in U.S. Pat. Nos. 3,953,566 and 4,187,390. Such membranes of expanded polytetrafluoroethylene are present in commercially available fabrics from W. L. Gore and Associates, under the tradename GORE-TEX® fabric. The water vapor permeable and waterproof membrane may be composed of a polyurethane coated microporous expanded polytetrafluoroethylene membrane made substantially according to the teachings of U.S. Pat. Nos. 4,194,041 and 4,942,214 assigned to W.L. Gore and Associates, Inc, in Elkton, Md.

According to an embodiment, the at least one first textile is laminated on the first side of the membrane. Such laminates are principally known in the art.

In an embodiment the textile has a porosity of at least 0.5 g/m$^2$/μm. With such textile, a good combination of mechanical stability, flexibility and sealing performance can be achieved. In another embodiment the textile has a porosity of at least 0.7 g/m2/μm, preferably at least 0.85 g/m$^2$/μm. In this case the material can penetrate and seal any seams that may exist in the membrane. The openness or porosity of a textile can be calculated by dividing the weight per area in grams per square meter divided by the thickness in micrometer. The thickness is measured at a load of 20 kPa.

The membrane may also have at least one further textile laminated to it, e.g. on the side opposite the side having the print material on it.

Advantageously, the thermoplastic material can be printed on an elastic laminate. U.S. Pat. No. 5,804,011 discloses fabrics being stretchable in two dimensions. The textile layer may have an elastic textile configuration, e.g may be made as a knit having an elastic knit pattern (like a tricot, warp knit, or similar knit pattern). In such case the textile need not necessarily include elastic threads to provide the desired elastic characteristics. However, in a number of configurations, it may be helpful if the textile layer comprises elastic filaments, e.g. made from elastane, to further enhance the elasticity of the textile layer.

The membrane, onto which the thermoplastic material is printed, can also be stretchable. The stretchability may be created by material and/or shape.

Elasticity or stretchability of the membrane, and any other layer mentioned herein, e.g. the textile may be measured according to DIN EN 14704-1 (July 2005), method A. The test may carried out as set out therein, while using test samples of the following configuration: Test sample width=25 mm, test sample testing length=50 mm (testing length refers to the free length of the test sample in between the clamps on its opposite side), whole length of test sample=100-150 mm. The test sample is subject to 5 consecutive test cycles. In each test cycle, the test sample is subject to a constant tensioning force of 7.5 N, and the maximum elongation E of the test sample is measured. Otherwise, test conditions are as set out in DIN EN 14704-1 (July 2015), method A. A test sample is considered elastic in case it achieves a maximum elongation E compared to its original length of at least 64 mm at the end of the 5th test cycle. More preferably, a test sample may achieve a maximum elongation E of at least 8 mm, at the end of the 5th test cycle. Even more preferably, a test sample may achieve a maximum elongation E of at least 10 mm, at the end of the 5th test cycle. In all cases, the test sample is required to have at least 80% recovery, measured 30 min after release of the tensioning force. Recovery refers to the remaining elongation C according to DIN EN 14704-1 (July 2015). When relaxing the tensioning force after the end of the 5th test cycle, the test sample recovers to a remaining elongation C according DIN EN 14704-1 (July 2015). A test sample has at least 80% recovery in case the remaining elongation C is at most equal to 20% of the maximum elongation measured according to DIN EN 14704-1 (July 2015). For example, in case the maximum elongation E of a test sample at 7.5 N is 6 mm, a remaining elongation C≤1.2 mm is required. In particular embodiments, a recovery of even 90% or more after 30 min may be achieved.

The invention may advantageously be employed in a case in which the waterproof and water vapor permeable membrane is formed in a three-dimensional shape. Any external and/or internal components of a composite, such as a shoe upper, may be printed directly onto the membrane.

According to an embodiment, the layered product is a component of footwear. Particularly, the waterproof and water vapor permeable membrane is formed as a three-dimensional bootie, insert or sock. For example, any external and/or internal components of a shoe upper may thus be printed directly onto the bootie membrane. The three-dimensional bootie, insert or sock may be or comprise a seamless membrane formed into the shape of a last or a foot, which can be used to create a bootie, insert or sock, and is for example described in WO2015/123482.

According to an embodiment, the three-dimensional bootie has at least one seam on a bottom part thereof, wherein the at least one seam is covered by the at least one three-dimensional build layer which forms a waterproof seal of the at least one seam. Thus, an effective waterproofing and sealing of the bootie bottom can be performed, wherein the use of a seam tape can advantageously be dispensed with.

In a preferred embodiment, the at least one three-dimensional build layer also forms a sole on the bottom part of the bootie. Advantageously, a bottom sealing and a sole can thus be created in one manufacturing step.

According to another aspect, footwear is provided which comprises an upper and a sole, wherein the upper comprises a layered product according to aspects and embodiments as described herein.

According to a preferred embodiment, the upper comprises an outer material and the layered product forms at least part of the outer material. According to a further embodiment, the upper comprises a bottom part above the sole, wherein the bottom part is formed at least in part by the thermoplastic material. According to a further embodiment, the sole is formed at least in part by the thermoplastic material. Advantageously, in this way portions of or complete uppers and soles can be created.

According to another aspect, a method of manufacturing a layered product as described herein is provided, wherein the thermoplastic material is selectively deposited on the first side of the membrane from a dispenser.

Particularly, according to an embodiment, the thermoplastic material is provided having a temperature of 210 to 250° C. when leaving the dispenser.

According to an embodiment, the dispenser is placed at a distance of 0.00-0.15 mm to the membrane printing surface or 0.05 to 0.15 mm to the first textile printing surface.

The invention will be described in more detail in the following by way of exemplary embodiments which are depicted in the Figures.

Figure 3A:
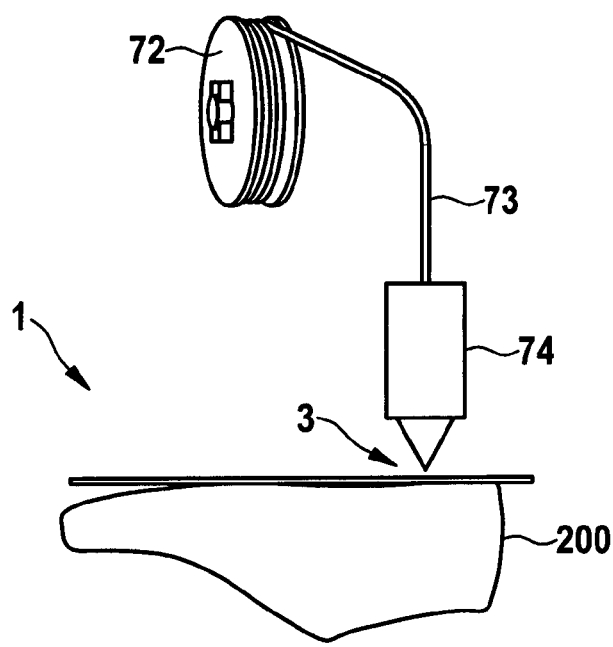
Figure 3B:
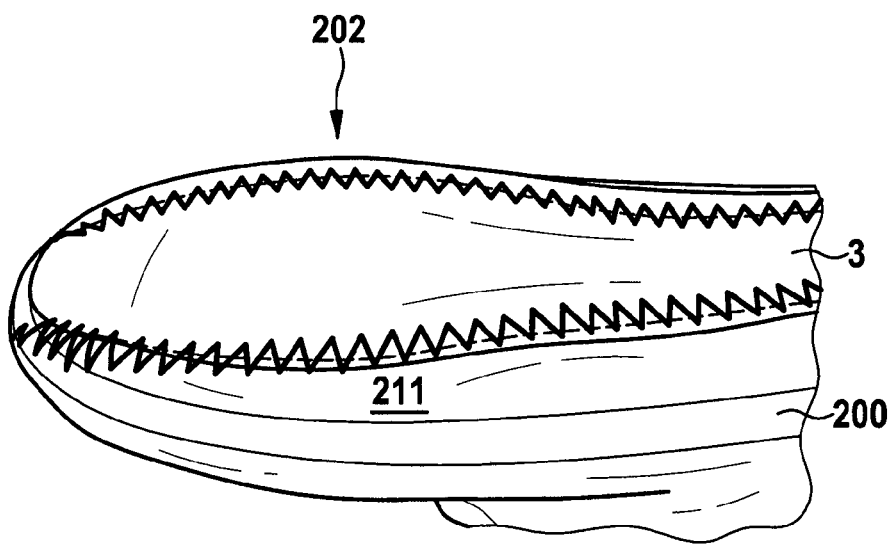
Figure 3C:
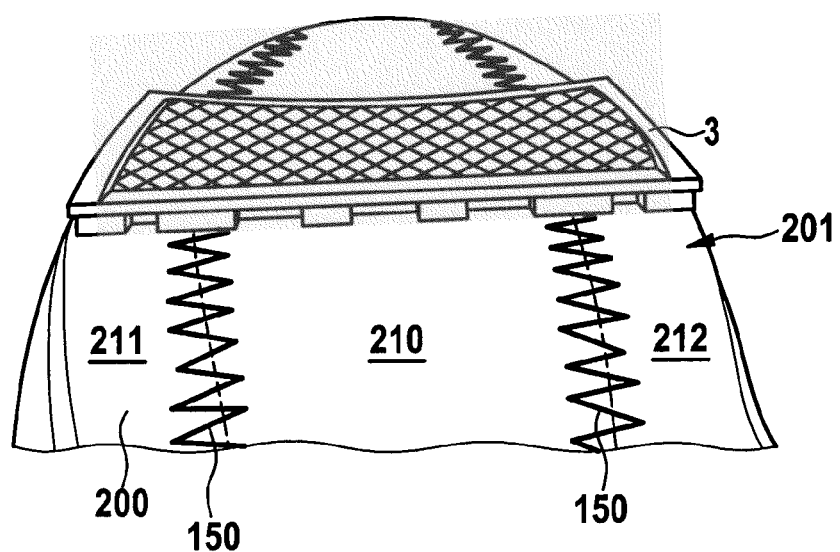
Figure 3D:
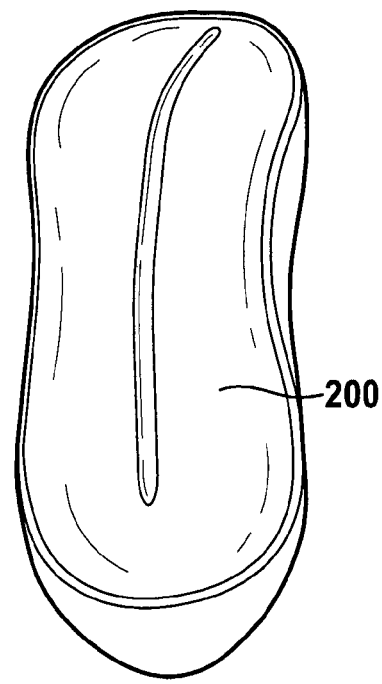
Figure 4A:
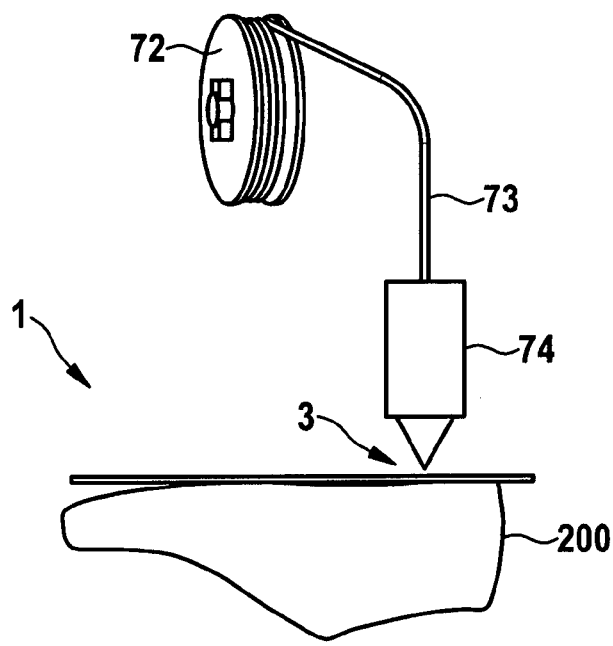
Figure 4B:
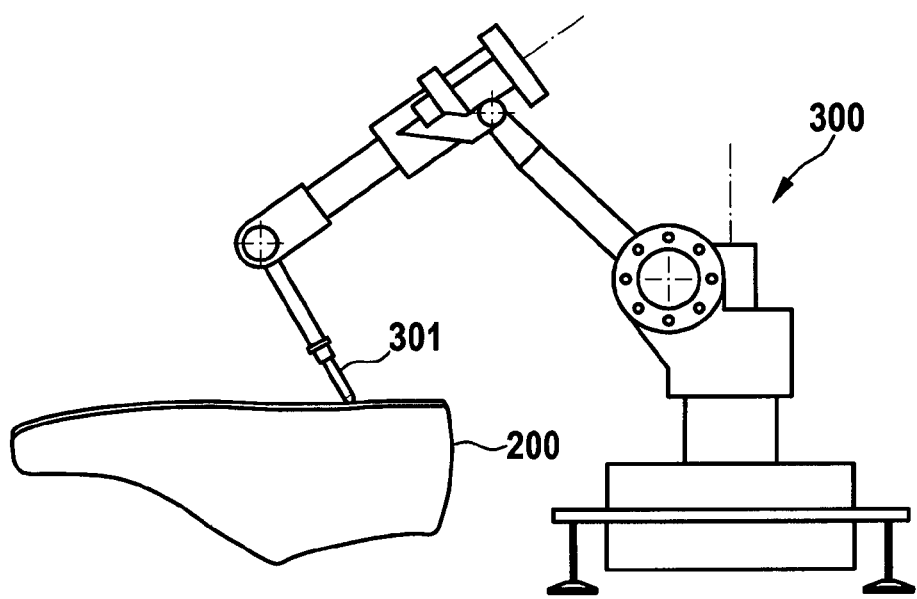
Figure 5:
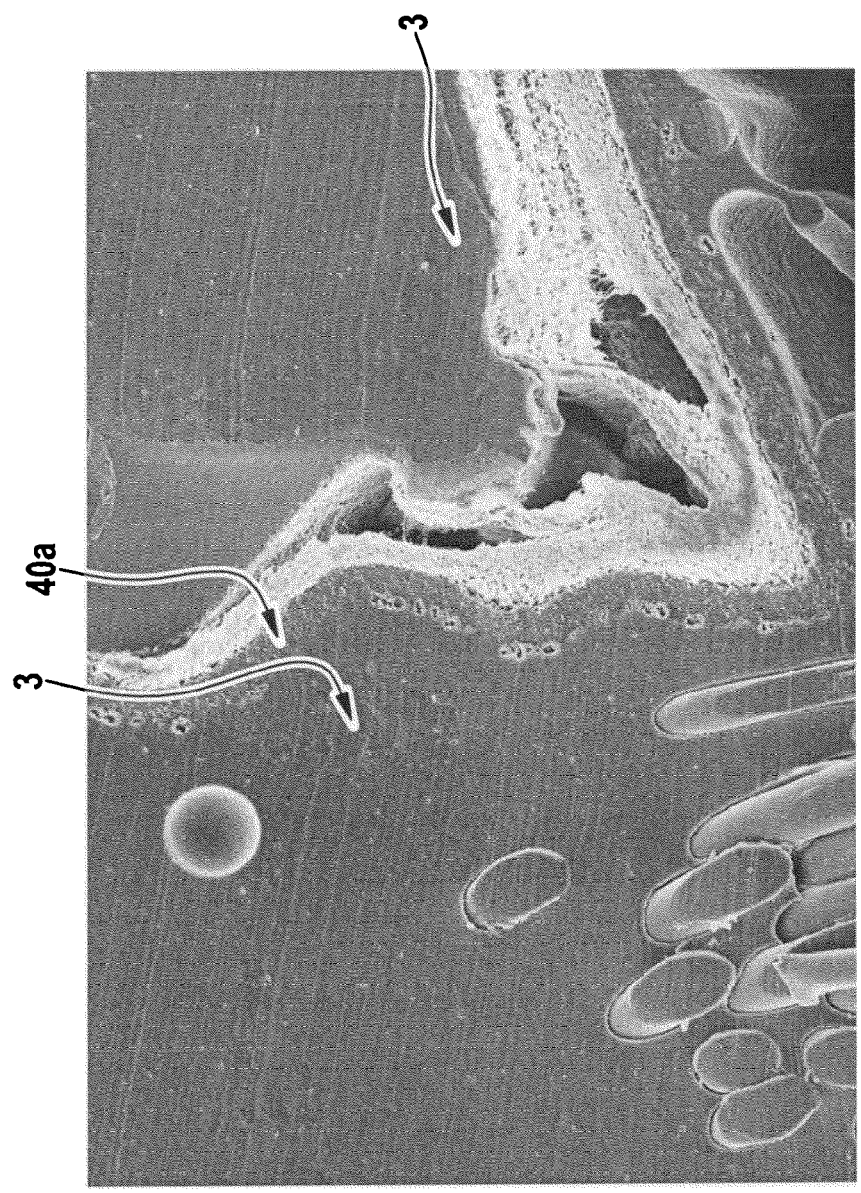
Figure 6:
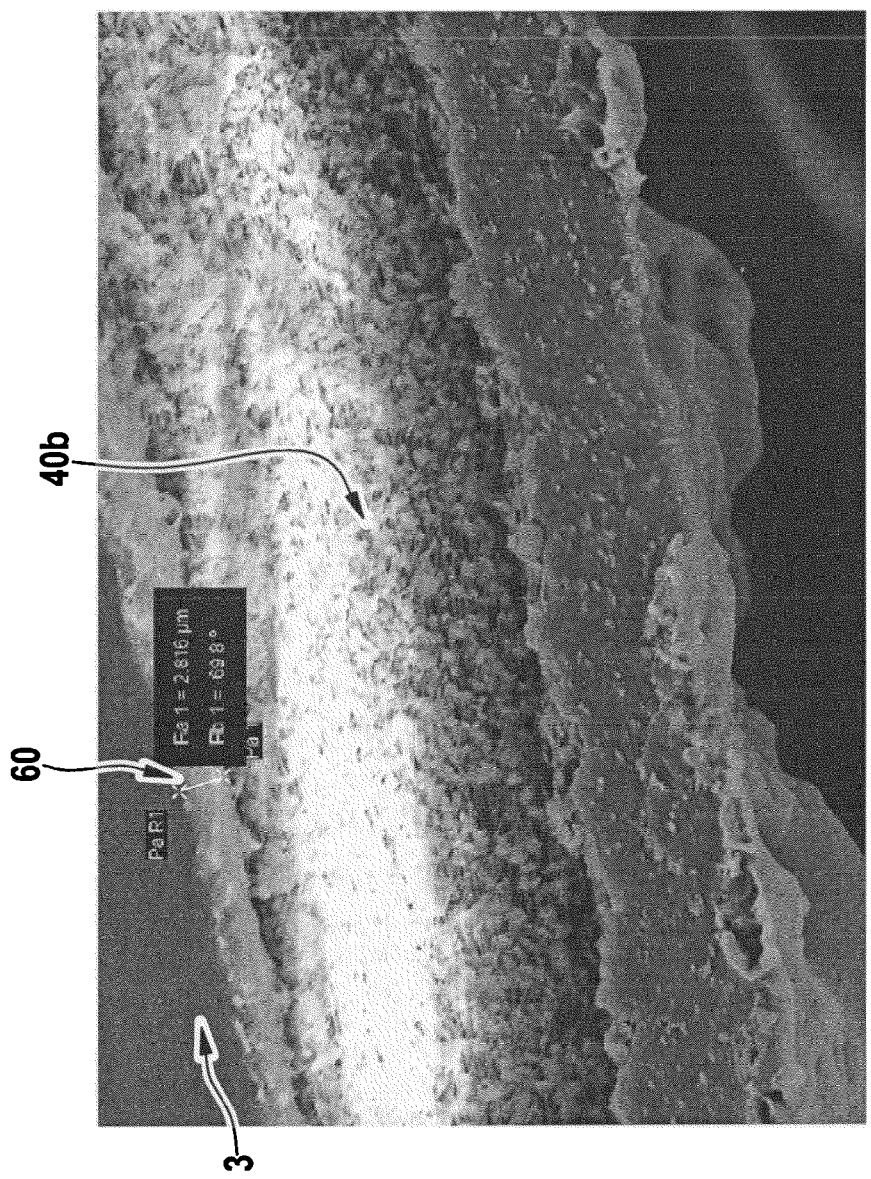
Figure 8A:
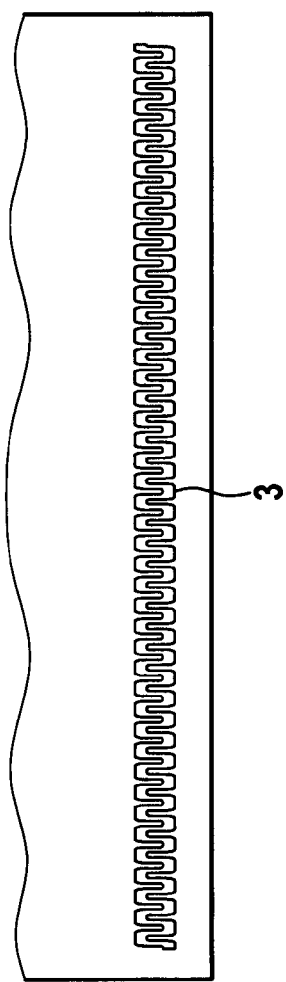
Figure 8B:
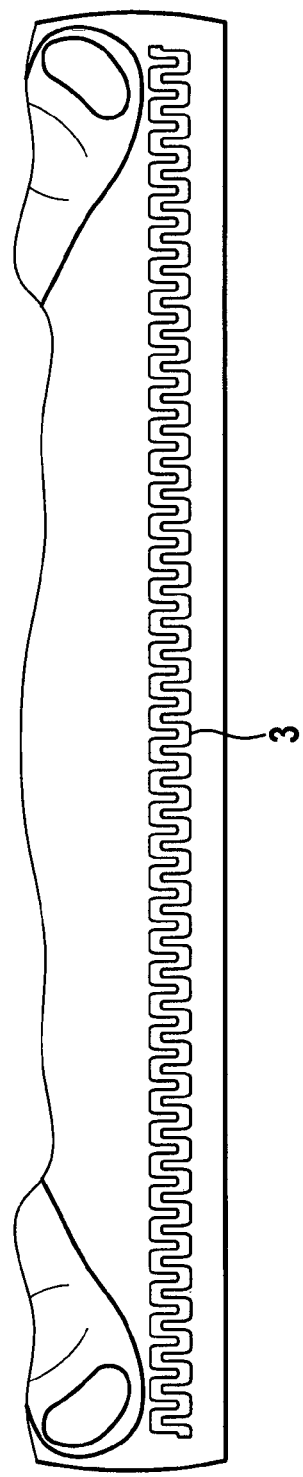

FIG. 1 shows a schematic diagram of a layered product according to embodiments of the present disclosure, FIG. 2 shows a schematic depiction of a manufacturing apparatus using a 3D printer employing a FDM printing technology and a layered product manufactured therewith, here in the form of a shoe upper, according to an embodiment, FIG. 3 shows a schematic depiction of another manufacturing apparatus using a 3D printer employing a FDM printing technology and a layered product manufactured therewith, here in the form of a bottom layer formed on a bootie of footwear, according to an embodiment, FIG. 4 shows a schematic depiction of another manufacturing apparatus using a 3D printer employing a FDM printing technology and a layered product manufactured therewith, here in the form of a bootie formed as a shoe upper, according to an embodiment, FIG. 5 shows a cross-sectional view of a thermoplastic material printed onto and bonded to a non-porous membrane material, such as a PU membrane layer, according to an embodiment, FIG. 6 shows a cross-sectional view of a thermoplastic material printed onto and bonded to a porous membrane material, such as an ePTFE membrane layer, according to an embodiment, FIG. 7 shows a cross-sectional view of a thermoplastic material printed onto and bonded to a textile layer, here a textile layer comprising monofilaments made from polyamide, according to an embodiment, FIG. 8 shows an embodiment of a thermoplastic material formed to be elastic by shape in an un-tensioned state (FIG. 8A) and tensioned state (FIG. 8B).

FIG. 1 shows a schematic diagram of a layered product 1 according to embodiments of the present disclosure. According to FIG. 1A, which shows a first embodiment, the layered product 1 comprises a waterproof and water vapor permeable membrane 4 which has a first side 41 and a second side 42. In the present embodiment, the first side and the second side are not covered by any additional layer, such as a respective textile layer, to form a commonly known 2-layer or 3-layer membrane laminate. The membrane 4 may have a monolithic structure, i.e. may be manufactured from one membrane material 40 which is waterproof and water vapor permeable. According to other embodiments, the waterproof and water vapour permeable membrane 4 may comprise a multilayer or composite structure, e.g. may be manufactured with different kinds of material, for example with at least one layer of porous expanded polytetraflouropolymer (ePTFE) and a continuous layer of polyurethane (PU) on one side of the porous ePTFE layer, as commonly known and employed in the art.

According to FIG. 1B, the membrane 4 comprises at least one first textile 5 on the first side 41 of the membrane 4. As such, the membrane is part of a known 2-layer laminate with at least one textile layer 5 on one side thereof. According to other embodiments, a second textile layer (not shown) may be arranged on the second side 42 of the membrane 4, depending on the particular application. For example, the first textile 5 comprises a monofilament polyurethane knit.

In both embodiments shown in FIGS. 1A and 1B, thermoplastic material 3 covers at least a portion of the first side 41 of the membrane 4. For example, the thermoplastic material 3 forms a continuous layer or a discontinuous layer, e.g. provides a particular pattern or structure on the first side 41 of the membrane 4. The thermoplastic material 3 is formed by at least one three-dimensional build layer 3-1 to 3-$n$, in the present embodiments of FIG. 1 by four three-dimensional build layers 3-1 to 3-4 (see also FIG. 7) which are schematically shown by means of a respective dashed line. That is, the final layer or structure of thermoplastic material 3 is formed by one or a plurality of three-dimensional build layers 3-1 to 3-$n$ which respectively comprise a thermoplastic material. In particular, in most cases, the thermoplastic material 3 is formed by at least two three-dimensional build layers 3-1 to 3-$n$.

Particularly, the one or more three-dimensional build layers 3-1 to 3-$n$ are each formed by 3D printing technology. In contrast to common printing technologies such as screen and gravure printing, a build layer formed by a 3D printer (printer employing 3D printing technology) is formed at least partly by thermoplastic material and is typically part of a layer-by-layer structure in which one build layer is formed upon another (in a kind of layer stack arrangement). Many 3D printers use an additive, layer-by-layer approach to build three-dimensional parts or structures.

The terms "three-dimensional printing," "3D printer," "printing," and the like generally describe various fabrication techniques for making three-dimensional (3D) structures or objects, here formed on a membrane, by selective deposition, jetting, fused deposition modeling, and other techniques known in the art or that may be known in the future that use a build material or print material to fabricate a three dimensional structure or object. In particular, the term "three-dimensional build layer" shall mean any kind of layer that is formed by such fabrication techniques.

Exemplary 3D printing systems and objects produced therewith are disclosed, in particular, in the following references:

In US 2016/0185041 A1, thermoplastic 3D objects are printed directly onto permeable materials with a high strength bond. In order to improve the adhesion of the 3D object to the permeable material, the bonding layer of the liquid thermoplastic material that is printed directly onto the permeable material can be deposited at modified 3D printer settings that can include a hotter than normal material deposition temperature. The temperatures that need to be used to achieve this high bond strength range from 250 to 270° C. Additional build layers of the liquid thermoplastic material are printed on the bonding layer to complete the 3D objects. In some embodiments, the thermoplastic material can be printed directly onto a permeable material. The permeable material can be any material or structure having pores, recesses, openings through holes or pathways that allows the liquid state thermoplastic material being used to print the 3D object to pass at least partially through or be at least partially absorbed. Permeable materials can include any porous materials, textiles, fabrics, knits, woven materials, mesh, polymers, rubbers, foams, etc. The materials can be in the form of a flexible cloth, a sheet, a layer and other structures having pores, recesses, openings through holes or pathways through which the liquid state thermoplastic material can at least partially pass through. However, the permeable materials taught therein are not of those materials which are waterproof and water vapor permeable, i.e. are not microporous or continuous membrane layers, such as waterproof and water vapor permeable ePTFE and PU membrane layers US 2016/0192741 A1 teaches generating a footwear insole shape by supplying a core reinforced filament having a matrix material impregnating reinforcing strands aligned along the filament, as well as a fill material separately from the core reinforced filament and depositing at least one shell of fill material within an insole shape upon a print bed. The core reinforced filament is deposited to fuse to the fill material within a first reinforcing region formed with respect to the insole shape. A cutter upstream of the nozzle tip cuts the core reinforced filament, and a remainder of the core reinforced filament is deposited to complete the first reinforcing region. A nozzle tip applies pressure to continuously compact the core reinforced filament toward the insole shape as the core reinforced filament is fused to the fill material.

U.S. Pat. No. 9,474,331 discloses an article of footwear having printed structures disposed on the article by a three-dimensional printer. The printed structures include extended portions and fastener receiving portions. The extended portions are at least partially embedded in the upper. The fastener receiving portions are at least partially spaced apart from an exterior surface of the upper.

US 2015/0320138 A1 discloses a shoe with a three-dimensional (3-D) surface texture created using rapid manufacturing techniques. A plurality of 3-D surface texture options is presented on a user interface. Each of the options is associated with one of a plurality of 3-D surface textures to be applied to a portion of a shoe. A selection of a 3-D surface texture is received and is used in part to generate a design file. The design file is used to instruct a rapid manufacturing device to manufacture the portion of the shoe comprised of the 3-D surface texture using a rapid manufacturing technique.

As understood by one of ordinary skill in the art and as described further herein, 3D printing according to embodiments of the present invention can include selectively depositing layers of a fluid build or print material to form a 3D structure on a membrane. In general, a fluid print material can be deposited through a dispenser, which may be a heated nozzle through which a filament print material is fed to generally melt the filament print material and dispense the print material from the exit of the dispenser to form a respective build layer.

In an embodiment of the present invention, the height of a respective build layer 3-1 to 3-$n$ may be at least 0.05 mm. Typically, the height of a respective build layer 3-1 to 3-$n$ is approximately 0.1 mm. Such respective build layer shall be understood as forming a three-dimensional build layer as termed herein. According to embodiments, as shown in FIGS. 1 and 7, with four build layers 3-1 to 3-4 placed upon one another, a layer of thermoplastic material 3 can be produced with a height of 0.4 mm.

The thickness of each individual build layer may be varied according to the respective application. Likewise, the width and/or length of each of the build layers may be varied. For example, a dispenser may have various nozzles (or may be equipped with various exchangeable nozzles)

having various diameters/widths through which the print material is printed onto a printing surface in various configurations.

According to an embodiment, the one or more three-dimensional build layers 3-1 to 3-n are each formed according to additive manufacturing technology, in particular according to Fused deposition modelling (so-called FDM) technology.

Each one of the three-dimensional build layers 3-1 to 3-n is printed onto the first side 41 of the membrane 4 such that the thermoplastic material 3 of the build layers (particularly of the lowermost build layer 3-1) is bonded to the membrane material 40 of the membrane. This is also explained in more detail below with respect to FIGS. 5-7 showing this in greater detail. In the embodiment of FIG. 1A, the thermoplastic material 3 is printed onto the membrane 4 so that the thermoplastic material 3 of the lowermost build layer 3-1 comes directly into contact with the membrane material 40. In the embodiment of FIG. 1B, the thermoplastic material 3 is printed onto the membrane 4 by printing it onto the first textile layer 5 so that at least part of the thermoplastic material of the lowermost build layer 3-1 comes into contact with the membrane material 40 through penetration through the textile layer 5. In both embodiments, as explained in more detail below, the bonding of the thermoplastic material of build layers 3-1 to 3-n to the membrane material 40 is quite strong.

Now referring to FIG. 2, there is shown a schematic depiction of a manufacturing apparatus using a 3D printer employing a FDM printing technology (FIG. 2A) and a layered product manufactured therewith, here in the form of a shoe 100 and a shoe upper 101, according to a respective embodiment. The apparatus shown in FIG. 2A comprises platform 71 which the membrane 4 comprising a textile layer (not shown in the figure) to be printed with a layer or structure is placed upon. As commonly known by one of ordinary skill in the art, the employed 3D printing can include selectively depositing layers of a build or print material to form a three-dimensional build layer in a particular structure. Here, the thermoplastic print material has a filament structure and is stored on a spool 72 so that filaments 73 of thermoplastic material are drawn from the spool 72 and fed to a dispenser 74 which comprises a print head and a heated nozzle. As such, hot thermoplastic material 3 can be deposited onto the membrane 4 through dispenser 74, wherein through the heated nozzle the filament print material 73 is fed to generally melt the filament print material and dispense the print material from the exit of the dispenser 74 onto the membrane 4. The dispenser 74 is placed at a distance of 0.00-0.15 mm to the membrane printing surface or 0.05 to 0.15 mm to the first textile printing surface.

Figure 2B:
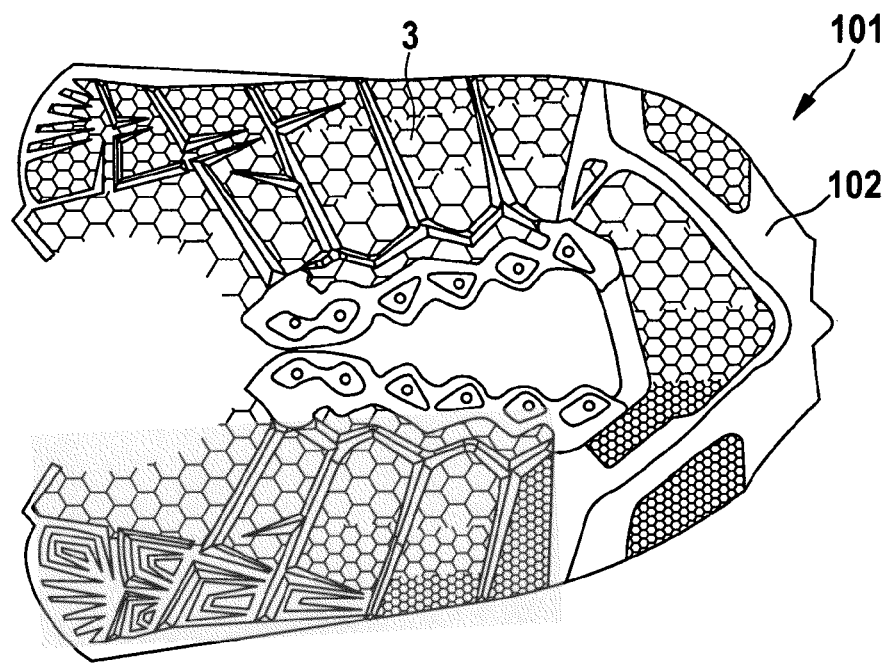
Figure 2C:
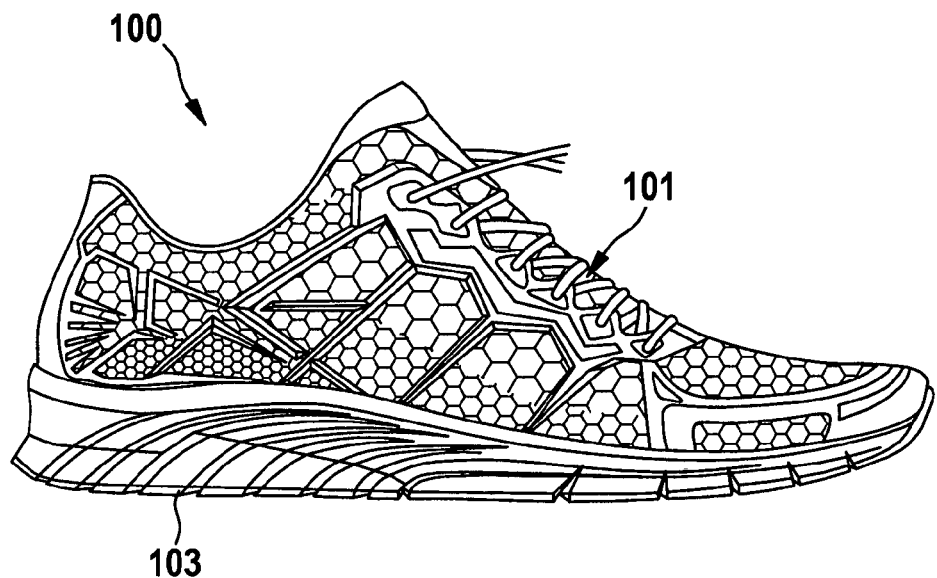

As shown in FIGS. 2B and 2C, a layered product 1 thus manufactured may be used as a component of footwear, particularly a shoe 100. For example, layered product 1 is part of an upper 101 of the shoe 100. During manufacture, the upper 101 comprising the membrane 4 may be formed two-dimensionally as shown in FIG. 2B and laid in two-dimensional form onto the platform 71 for forming a structure by the thermoplastic material 3, such as patterns of studs, a net structure or other patterns, etc., as shown. Once the structure is formed in an apparatus according to FIG. 2A, the upper 101 including the membrane 4 can be brought into a three-dimensional shape for forming the shoe 100. In the present embodiment, the upper 101 comprises an outer material 102 and the manufactured layered product 1 forms at least part of the outer material 102. For example, at least one or more sections of the outer material 102 can be manufactured from the layered product 1 such that the layered product 1 forms the outer material 102 in these sections. According to other embodiments, at least one or more sections of the outer material 102 comprise a composite material or multilayer arrangement, wherein one component or layer of such composite material or multilayer arrangement may be the layered product 1.

According to a further embodiment, the sole 103 of the shoe 100 may also be formed at least in part by the thermoplastic material 3. Particularly, such sole 103 may be formed by a plurality of three-dimensional build layers disposed one upon the other and printed onto a sole-sided membrane 4 according to a process similarly as described with respect to FIG. 2A, or other 3D printing process.

FIG. 3 shows a schematic depiction of another manufacturing apparatus using a 3D printer employing a FDM printing technology and a layered product 1 manufactured therewith, here in the form of a bottom layer formed on a bootie of footwear, according to an embodiment. The apparatus according to FIG. 3A is similar to that of FIG. 2A, so that the exemplary components used for 3D printing will not be explained in more detail again. Different to the apparatus according to FIG. 2A, the thermoplastic material 3 is printed on a surface of a three-dimensional object, here in the form of a bootie 200 of footwear. The bootie 200 is mounted on a last (not shown), so that the thermoplastic material 3 is not printed on a (absolutely) flat surface of a platform as in FIG. 2A, but on a quasi flat surface of a bottom part of the three-dimensionally formed bootie 200 mounted on the last. To this end, the printing apparatus requires some modification in its controlling software as compared to the process according to FIG. 2 in that the dispenser 74 also performs (slight) vertical movements to compensate for any irregularities in height in the bootie's bottom surface.

In this embodiment, the waterproof and water vapor permeable membrane 4 (e.g., as described in relation to FIG. 1) is formed as a three-dimensional bootie 200. For example, the membrane 4 and bootie 200, respectively, may be manufactured according to commonly known processes, such as by sewing respective parts of membrane 4 together to form a three-dimensional bootie 200 having the form of a shoe or by forming the membrane 4 integrally into a three-dimensional form. In the present embodiment, the three-dimensional bootie 200 has at least one seam 150 on a bottom part 201 of the bootie 200. For example, the seam 150 is sewn and is provided around the bottom part 201 of the bootie, which bottom part 201 also forms a bottom part of the upper (cf. FIG. 2C) below the wearer's foot once formed into a shoe 100. For example, the seam 150 connects a bottom layer 210 (e.g. made of a membrane with a non-woven textile on it) of the bootie arranged below the sole of the wearer's foot with respective side layers 211, 212 of the bootie which form the shaft portion of the bootie and upper. The bottom part 201 can be a waterproof and water vapor permeable laminate of a membrane and a textile (e.g., in embodiments in which the sole, such as the sole 103, or a bottom side part of the upper material of the footwear has one or more openings and/or channels for increasing breathability), or can be a waterproof and non-breathable material.

According to other embodiments, the bottom part 201 can be left open, so that the bootie 200 is open at the bottom thereof. The shaft portions of the bootie may then be attached to an inner sole of the upper, or to the outer sole, for example.

In a preferred embodiment, the one or more seams 150 are covered by the at least one three-dimensional build layer 3-1 to 3-*n* which form a waterproof seal of the seam 150 (cf. waterproof seal 30 in FIG. 7). For example, one or more of the build layers 3-1 to **3-*n* may cover the area around the seam 150 only (cover the seam 150 including some side extension on each side of the seam 150 to create a "warm-up" zone for the sealing, i.e. a transition zone which creates waterproofness from the side (sealing margin), cf. FIG. 7 having a quite low sealing margin 31 of, e.g., 0.7 mm). If the seam 150 is sewn in a zig-zag manner, as shown in FIG. 3C, then the one or more of the build layers 3-1 to 3-*n* sealing the seam 150** may also have the form of a zig-zag shape.

According to another embodiment, one or more of the build layers 3-1 to **3-*n* may cover the width and/or length of the bottom part 201 of the bootie 200, as shown in FIG. 3C. In such embodiment, the one or more three-dimensional build layers 3-1 to 3-*n* may also form a sole 202 on the bottom part 201 of the bootie 200, as shown in FIG. 3B, or a partial sole layer as shown in FIG. 3C. That is, such sole 202 forms a structural sole layer on the bottom part 201 of the bootie and, at the same time, seals the seam 150 thereof waterproof. According to a further embodiment, with respect again to FIG. 2C, the bottom part of the upper 101 above the sole 103 is formed at least in part by the thermoplastic material 3. All the above embodiments have the advantage that a sealing tape, as commonly used in the art, is not necessary since the sealing can completely be established by the printed thermoplastic material 3**. This may lead to considerable cost reductions in the manufacturing process.

FIG. 3D shows another embodiment of a bootie 200, which is a bootie made from a seamless membrane. In particular, the three-dimensional bootie 200 may be or comprise a seamless membrane formed into the shape of a last or a foot, which can be used to create a bootie, insert or sock, and is for example described in WO2015/123482.

FIG. 4 shows a schematic depiction of another manufacturing apparatus using a 3D printer employing a FDM printing technology and a layered product 1 manufactured therewith, here in the form of a bootie 200 formed as a shoe upper, according to an embodiment. In this embodiment, the thermoplastic material 3 may be printed not only on a planar surface of a three-dimensional object, such as the bootie 200, as described with respect to FIG. 3, but also at other parts of the bootie 200, such as in the shaft region above the sole. The bootie 200 may be seamed (created by stitching edges of membrane and/or laminate together) or seamless, e.g., created by one continuous unbroken piece of membrane or laminate. For example, the pattern of the upper 101 shown in FIG. 2B, which is printed onto the upper 101 on a planar surface according to FIG. 2A, may be printed onto the three-dimensional surface of the bootie 200 while being placed on a last (not expressly shown). To this end, the manufacturing assembly may further employ a robot 300 which is capable of creating a three-dimensional printed upper on the bootie mounted on the last and a sole below the bottom part of the upper by being movable in 6 degrees of freedom (e.g., using a so-called 3+3 axis 3D printer, i.e. having 3 translational and 3 rotational axes). The robot 300 is provided with a 3D printing assembly as schematically shown in FIG. 4A. For example, the dispenser 74 is part of or mounted on the robot's arm 301 which is movable in 6 degrees of freedom (e.g., in 3 translational and 3 rotational directions) and can be moved along and around the surface of the bootie 200 mounted on the last. The deposition process as such is similar to that of FIGS. 2 and 3.

Now turning to FIG. 5, it shows a cross-sectional view of a thermoplastic material 3 printed onto and bonded to a non-porous membrane material **40*a*, according to an embodiment. For example, the membrane material is formed of or includes a PU membrane layer which is continuous, but waterproof and water vapour permeable, as commonly known and employed in the art. For example, the membrane is a composite membrane with a porous ePTFE layer (shown in bright color in FIG. 5) and a PU layer laminated onto the ePTFE layer. The thermoplastic material 3 is printed onto the composite membrane from both sides. As can be seen from FIG. 5, the thermoplastic material 3 formed by printing multiple build layers 3-1 to 3-*n* one upon the other is melted with the PU membrane material 40*a*** such that a waterproof seal is created at the joining region.

FIG. 6 shows a cross-sectional view of a thermoplastic material 3 printed onto and bonded to a porous membrane material, such as an ePTFE membrane layer, according to an embodiment. As can be seen in the bonding area 60 shown in FIG. 6, the thermoplastic material 3 formed by printing multiple build layers 3-1 to **3-*n* one upon the other penetrates into pores of the porous membrane material 40*b***. For example, the penetration may be 1 to 3 μm deep (measured from the surface of the porous layer), which provides for a good seal performance. In the present embodiment, the bonding depth is in a range of about 1 to 2.5 μm. In order to achieve such penetration, the dispenser should generate sufficient pressure, for example by adjusting a distance of the printer head to the printing surface appropriately as described herein.

FIG. 7 shows a cross-sectional view of a thermoplastic material printed onto and bonded to a textile layer 5, which is bonded to a membrane 4. In this embodiment, the textile layer 5 comprises an arrangement of monofilaments 51, e.g. a monofilament knit made from polyamide. The thermoplastic material 3 is formed by printing multiple build layers, in this embodiment four build layers 3-1 to 3-4 one upon the other, onto the textile layer. As can be seen from FIG. 7, the thermoplastic material 3 thus formed is at least partly melted with monofilaments 51, and also penetrates at least partly through to the membrane 4, such that a waterproof seal 30 is created in the joining region. The monofilament knit and 3D printed thermoplastic material build a homogenous continuum. According to an embodiment, the "warm-up" zone 31 (sealing margin) for creating the waterproof seal, as described above, may have a range from 0.6 to 0.8 mm. As compared with sealing margins typically employed with seam tapes, such sealing margin is advantageously quite low.

In each of the embodiments described with respect to FIGS. 5 to 7, the thermoplastic material 3 may include at least one of polyurethane (TPU), copolyester (TPC) and elastomers (TPE) or Nylon. Other thermoplastic materials may be used as well.

FIG. 8 shows an embodiment of a thermoplastic material 3 formed to be elastic by shape or pattern in an un-tensioned state (FIG. 8A) and a tensioned state (FIG. 8B).

Advantageously, the thermoplastic material 3 can be printed on an elastic laminate to support the functionality. The textile layer may have an elastic textile configuration, e.g. by an elastic knit pattern and/or comprises elastic filaments, e.g. made from elastane. The membrane, onto which the thermoplastic material is printed, can also be stretchable. The stretchability may be created by material and/or shape.

According to one embodiment, the thermoplastic material is also formed to be elastic, i.e. the material is per se elastic. It can thus follow the elasticity of the laminate material. In another embodiment, in addition or alternatively to using an elastic thermoplastic material, the thermoplastic material 3 is formed to be elastic by shape. In the present embodiment shown in FIG. 8, the elasticity is created by a zig-zag-shape of the thermoplastic material. As shown in FIG. 8B, the zig-zag-shaped material can be tensioned and retracts back into its (or almost its) original shape shown in FIG. 8A.

Apart from the exemplary shape shown in FIG. 8, other shapes having greater or lower elasticity are also possible. Employing a 3D printing process for printing a thermoplastic material onto a membrane material offers a wide functionality change by material and by shape/geometry. Flexible, but nevertheless quite hard structures can be created by such process to maintain the flexibility of employed membranes and membrane laminates.

The following is an example of potential parameters used in an embodiment of a printing process:

Printer: German RepRap X350 Pro
Laminate: thickness 0.7 mm, ePTFE membrane, adhered to a 100% monofilament PU knit on the print side and a multifilament knit with 30% PES and 70% PA on the other side
Print Material: Ninjatec SemiFlex (TPU)
Relevant print parameters:
Nozzle temperature: First Layer 240° C., Following Layers 230° C.
Bed temperature: 60° C. (temperature that surface on which bootie is placed is heated to)
Z-Offset: 0.8 mm (Laminate thickness+0.1 mm) (distance of dispenser above bed surface)
Layer height: 0.1 mm
Nozzle diameter: 0.25 mm
Printing speed: 25 mm/s Water Vapor Permeability (WVP) as used herein concerning the membrane may be tested as defined in EN ISO 15496 (2004), also known as the "Cup Test". A 20×20 cm or Ø 100 mm sample of membrane or membrane laminate to be tested is placed onto a container containing water and covered with a membrane. Then a cup containing potassium acetate and being covered by the same membrane is placed on the sample. Water vapor passes through the membrane to be tested into the cup, whose weight increase is then determined. The membrane is considered water vapor permeable or breathable if the WVP is greater than or equal to 0.01 g/(Pa*m²*h). If the required size of the sample cannot be obtained, a smaller sample may be used for the measurement using a smaller cup containing half the amount of potassium acetate specified in the Norm, i.e. 50 g instead of 100 g and mixed with 15.6 g of water. In case a smaller cup is used, the applied area in the calculation needs to be adjusted accordingly.

A membrane or laminate, i.e. a membrane bonded to a textile may be considered waterproof in case a 100 cm² sample of the material under investigation is able to withstand a water ingress pressure of at least 0.05 bar. Particularly, the material may even withstand a water pressure of at least 1 bar. The method for carrying out this test is described in the ISO Standard No. 811 (1981) (EN 20811 (1992)). The measurement is carried out by exposing a 100 cm² sample of the material under investigation to a rising water pressure. For this purpose, distilled water having a temperature of 20±2° C. is used. The rise in the water pressure is 60±3 cm H₂O/min. The water ingress pressure of the sample under investigation is that pressure at which water passes through the opposite side of the sample under investigation. If a 100 cm² sample cannot be obtained, a smaller sample may be used for the measurement. There is a linear correlation between sample size and water ingress pressure, so that the water ingress pressure may be calculated for a 100 cm² sample.

As to the first textile used herein according to some embodiments, such as the textile 5 shown in FIG. 1, according to various embodiments, any one of a knit, a woven or a non-woven textile may be used, using monofilaments or multifilament fibers.

The invention claimed is:

1. A layered product, comprising:
   a waterproof and water vapor permeable membrane having a first side and a second side, the membrane comprising a membrane material which is waterproof and water vapor permeable,
   a thermoplastic material which covers at least a portion of the first side of the membrane,
      wherein the thermoplastic material comprises at least one three-dimensional build layer on the first side of the membrane, and
   at least one first textile between the first side of the membrane and the at least one three-dimensional build layer,
      wherein at least a portion of the thermoplastic material contacts the membrane material of the membrane through the at least one first textile, and
   wherein the layered product is configured such that, when incorporated into a shoe having an interior surface and an exterior surface, the thermoplastic material defines at least a portion of the exterior surface of the shoe.

2. The layered product according to claim 1, wherein the at least one first textile comprises filaments and at least part of the filaments of the first textile is at least partly melted with the thermoplastic material.

3. The layered product according to claim 1, wherein the at least one first textile comprises polyamide (PA) monofilaments.

4. The layered product according to claim 1, wherein the membrane material comprises at least one porous membrane material, wherein the thermoplastic material of the at least one three-dimensional build layer extends into pores of the at least one porous membrane material.

5. The layered product according to claim 4, wherein the membrane material has a bubble point of less than 400 kPa.

6. The layered product according to claim 1, wherein the membrane material comprises at least one non-porous membrane material, wherein the thermoplastic material of the at least one three-dimensional build layer is melted with the at least one non-porous membrane material.

7. The layered product according to claim 1, wherein the thermoplastic material comprises at least one of polyurethane, copolyester or elastomers.

8. The layered product according to claim 1, wherein the thermoplastic material comprises at least one of polylactic acid, acrylonitrile butadiene styrene, polyaryletherketone, polytetrafluoroethylene, polyamide, polyamide-based copolyester, alkenyl succinic anhydride, high impact polystyrene, polyethylene, polycarbonate, polyamide, polyethylene terephthalate (PET) and PET modified by glycol, polypropylene, polyvinyl acetate, polyether ketone, polyetheretherketone, other thermoplastic elastomers or blends or co-polymers thereof.

9. The layered product according to claim 1, wherein the at least one three-dimensional build layer comprises at least one of an elastic material or a material providing elasticity by shape.

10. The layered product according to claim 1, wherein the membrane comprises at least one seam.

11. The layered product according to claim 1, wherein the at least one first textile has a porosity of at least 0.7 g/m²/µm.

12. The layered product according to claim 1, wherein the membrane material comprises at least one of expanded polytetrafluorethylene, polyurethane, polyester and copolyether ester, polyether, polyamide, a copolyether amide or polyacrylate.

13. The layered product according to claim 1, wherein a shape of the waterproof and water vapor permeable membrane is a three-dimensional bootie, insert or sock.

14. The layered product according to claim 1, wherein the at least one first textile has a porosity of at least 0.5 g/m²/µm.

15. A shoe comprising:
an upper; and
a sole,
   wherein the upper and the sole define an interior surface of the shoe and an exterior surface of the shoe, and
   wherein at least one of the upper or the sole comprises a layered product comprising:
      a waterproof and water vapor permeable membrane having a first side and a second side, the membrane comprising a membrane material which is waterproof and water vapor permeable,
      a thermoplastic material which covers at least a portion of the first side of the membrane,
      wherein the thermoplastic material comprises at least two three-dimensional build layers on the first side of the membrane, and
      at least one first textile between the first side of the membrane and the at least two three-dimensional build layers,
      wherein at least a portion of a lowermost build layer of the at least two three-dimensional build layers of the thermoplastic material contacts the membrane material of the membrane through the at least one first textile, and
      wherein the layered product is oriented such that the thermoplastic material defines at least a portion of the exterior surface of the shoe.

16. The footwear according to claim 15, wherein the upper comprises an outer material and the layered product is at least part of the outer material.

17. A method of manufacturing a layered product of claim 1, wherein the thermoplastic material is selectively deposited on the first side of the membrane from a dispenser, which is placed at a distance of 0.00 to 0.15 mm to the surface of the membrane.

18. The method according to claim 17, wherein the thermoplastic material is provided having a temperature of 210-250° C. when leaving the dispenser.

* * * * *